United States Patent
Chang

(10) Patent No.: US 9,253,073 B2
(45) Date of Patent: Feb. 2, 2016

(54) METHOD FOR LOOPBACK DETECTION AND NETWORK DEVICE UTILIZING THE SAME

(71) Applicant: ACCTON TECHNOLOGY CORPORATION, Hsinchu (TW)

(72) Inventor: Keng-Yuan Chang, Yuanlin Township (TW)

(73) Assignee: Accton Technology Corporation, Hsinchu (TW)

( * ) Notice: Subject to any disclaimer, the term of this patent is extended or adjusted under 35 U.S.C. 154(b) by 48 days.

(21) Appl. No.: 14/334,163

(22) Filed: Jul. 17, 2014

(65) Prior Publication Data
US 2015/0244606 A1 Aug. 27, 2015

(30) Foreign Application Priority Data
Feb. 26, 2014 (TW) .............................. 103106411 A

(51) Int. Cl.
| | |
|---|---|
| H04L 12/721 | (2013.01) |
| H04L 12/26 | (2006.01) |
| H04L 12/46 | (2006.01) |
| H04L 12/705 | (2013.01) |

(52) U.S. Cl.
CPC ............ *H04L 43/50* (2013.01); *H04L 12/4641* (2013.01); *H04L 45/18* (2013.01)

(58) Field of Classification Search
None
See application file for complete search history.

(56) References Cited

U.S. PATENT DOCUMENTS

| | | | | |
|---|---|---|---|---|
| 8,681,641 | B1 * | 3/2014 | Sajassi ................ | H04L 45/745 370/249 |
| 2014/0204944 | A1 * | 7/2014 | Zhou .................. | H04L 12/4633 370/392 |

* cited by examiner

*Primary Examiner* — Hoon J Chung
(74) *Attorney, Agent, or Firm* — Birch, Stewart, Kolasch & Birch, LLP

(57) ABSTRACT

A method for loopback detection includes: receiving a loopback detection frame by a port; detecting and determining whether the loopback detection frame is transmitted via the port; analyzing the loopback detection frame and determining whether a loopback has occurred in a network device when the loopback detection frame is transmitted via the port; when the loopback has occurred, determining the loopback has occurred in which of one or more virtual local area networks (VLANs) that the port joins in; blocking the VLAN(s) that the port transmitting the loopback detection frame joins in and in which the loopback occurred, for the port being unable to transmit any packet in the blocked VLAN(s); and when the loopback has not occurred, dropping the loopback detection frame.

12 Claims, 6 Drawing Sheets

METHOD FOR LOOPBACK DETECTION AND NETWORK DEVICE UTILIZING THE SAME

CROSS REFERENCE TO RELATED APPLICATIONS

This application claims priority of Taiwan Patent Application No. 103106411, filed on Feb. 26, 2014, the entirety of which is incorporated by reference herein.

BACKGROUND OF THE INVENTION

1. Field of the Invention

The invention relates to a loopback detection method and a network device utilizing the same, and more particularly to a non-STP (Spanning Tree Protocol) loopback detection method for detecting and solving the loopback problem and a network device utilizing the same.

2. Description of the Related Art

Ethernet network is a common local area network (LAN) technology. In a large-scale local area network, a loop may be formed between two or more bridges, such as switches. A packet may be transmitted repeatedly or flooded within the loop, not only occupying the bandwidth of the network device and consuming the resources of the network device, such as memory resources, but also deteriorating the efficiency of the network and the operation efficiency of the device.

FIG. 1A and FIG. 1B respectively show two kinds of loops formed in the LAN. In FIG. 1A, the packet 14 transmitted from a port 101 of a device 10 may be sent back by a device 12 via a switch (not shown in FIG. 1), hence forming a loop. In FIG. 1B, the packet 14 transmitted from a port 101 of a device 10 may be sent to another port 102 by a device 12 via a switch (not shown in FIG. 1), hence forming a loop. Since in FIG. 1A and FIG. 1B, the packets 14 are all sent back to the device 10, for the device 10, a loopback is formed.

Currently, the Spanning Tree Protocol (STP) is used primarily to resolve problems caused by the loop according to IEEE 802.1. Once a loop occurs, some links on the loop will be cut off by disabling port(s) of the switch, so as to break the loop. However, it is costlier to support the spanning tree protocol with hardware. If the spanning tree protocol is supported by software, then the computing unit of the device or the switch demands higher program computing capability. However, some devices or switches merely configure an Application Specific Integrated Circuit (ASIC) which has no program computing capability to handle the packet, so the Spanning Tree Protocol is incomplete for all kinds of devices or switches.

BRIEF SUMMARY OF THE INVENTION

A method for loopback detection and a network device are provided. An exemplary embodiment of a method for loopback detection used in a network device comprises: receiving a loopback detection frame by a port; detecting and determining whether the loopback detection frame is transmitted via the port by a loopback detection module; analyzing the loopback detection frame and determining whether a loopback has occurred in the network device by the loopback detection module when the loopback detection frame is transmitted via the port; Once the loopback has occurred, determining in which of one or more virtual local area networks (VLANs) that the port joins in by the loopback detection module; blocking the VLAN(s) that the port transmitting the loopback detection frame joins in and in which the loopback occurred by the loopback detection module, for the port being unable to transmit any packet in the blocked VLAN(s); and once the loopback has not occurred, dropping the loopback detection frame by the loopback detection module.

An exemplary embodiment of a network device comprises a port configured to receive a loopback detection frame and a loopback detection module comprising a loopback detection unit, a frame analysis unit and a processing unit. The loopback detection unit is coupled to the port and detects whether the loopback detection frame is transmitted from the port. The frame analysis unit is coupled to the loopback detection unit, and when the loopback detection frame is transmitted from the port, the frame analysis unit analyzes the loopback detection frame and determines whether a loopback has occurred in the network device. Once the loopback has occurred in the network device, the loopback detection module determines the loopback has occurred in which of one or more virtual local area networks (VLANs) that the port joins in. Once the loopback has not occurred, the loopback detection module drops the loopback detection frame. The processing unit is coupled to the port and the frame analysis unit. Once the loopback has occurred in the network device, the processing unit blocks the VLAN(s) that the port transmitting the loopback detection frame joins in and in which the loopback occurred, for the port being unable to transmit any packet in the blocked VLAN(s).

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
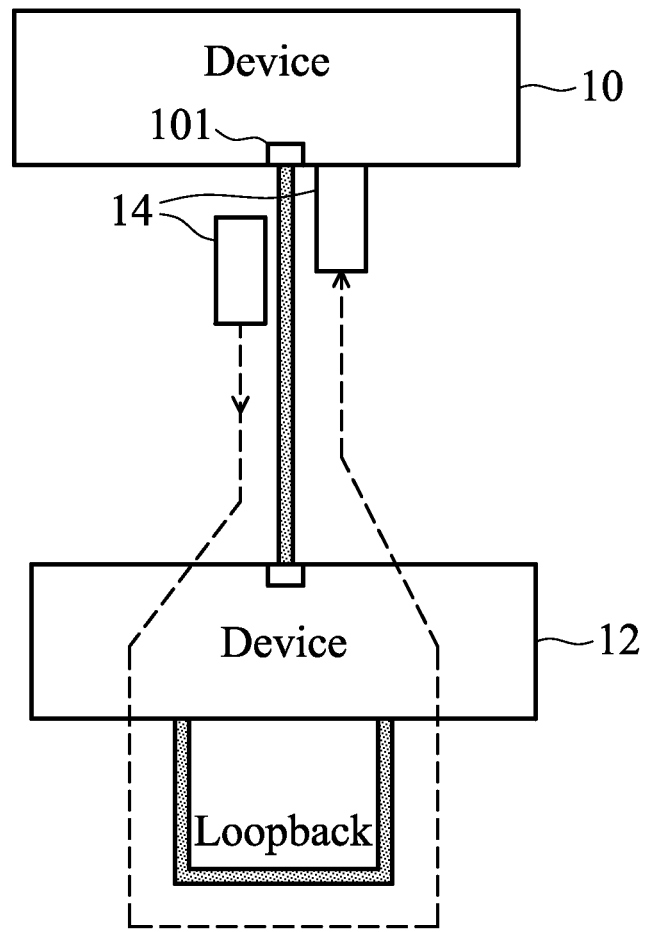
FIG. 1A and FIG. 1B are schematic views illustrating two kinds of loopbacks formed in a local area network in the prior art.
Figure 1B:
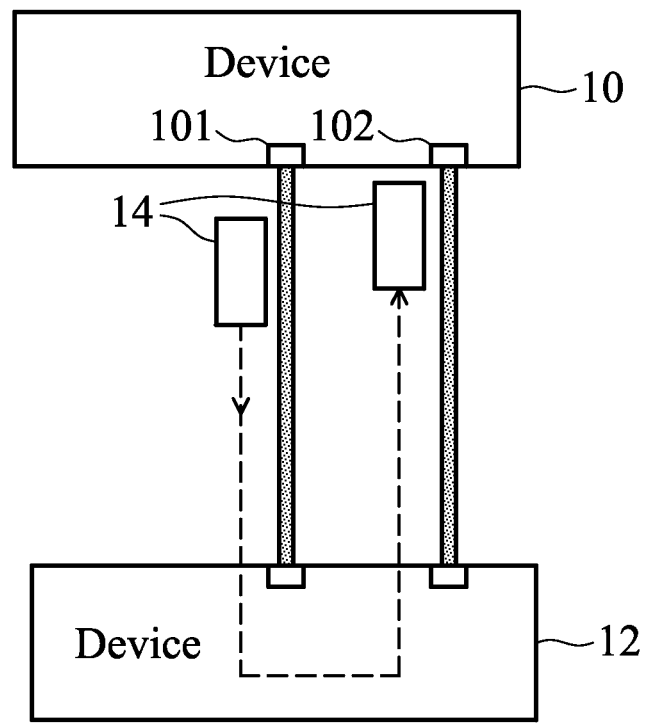
Figure 2:
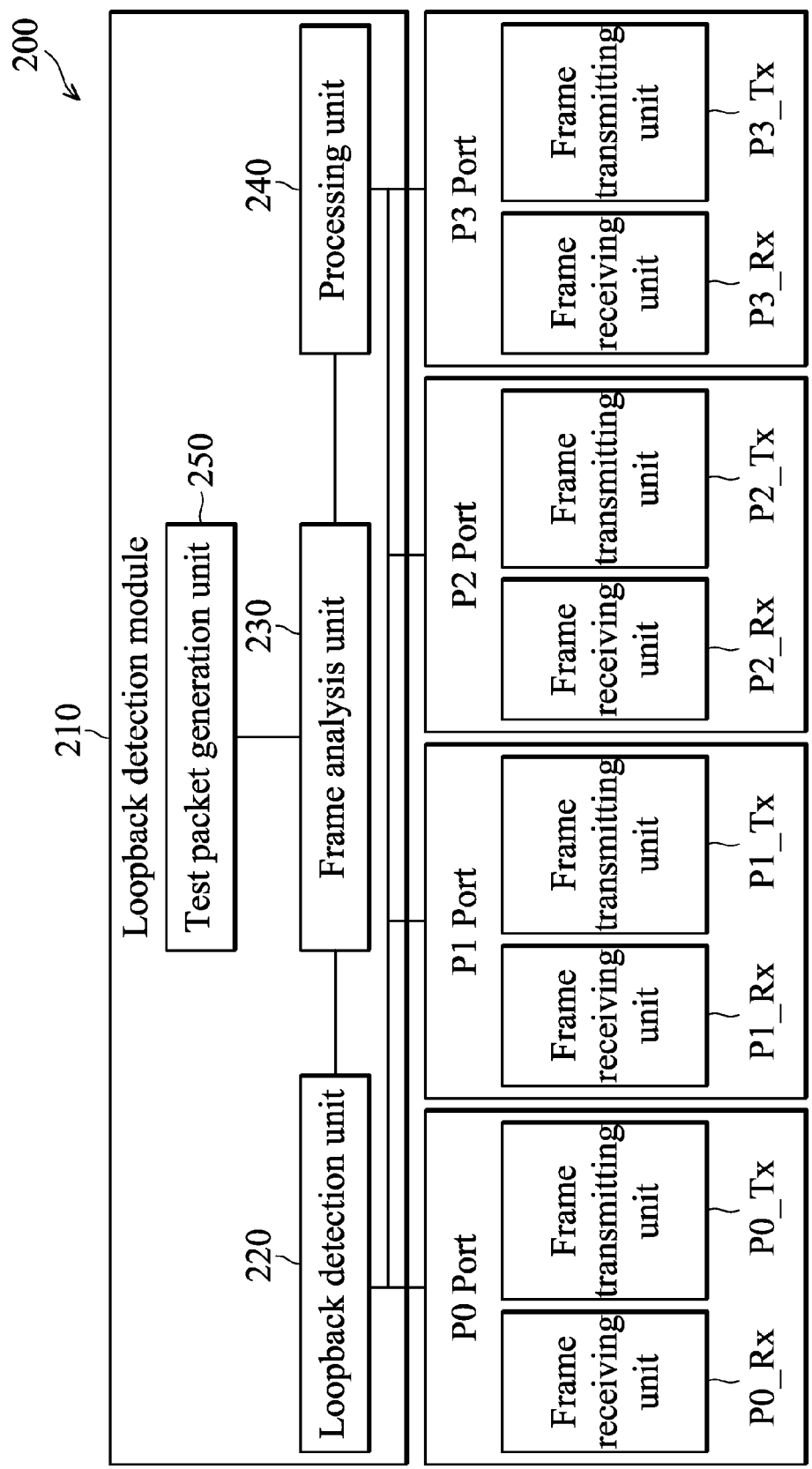
FIG. 2 is a block diagram of a network device according to an embodiment of the present invention.

FIG. 2 is a block diagram of a network device 200 according to an embodiment of the invention. The network device 200 may be a wired/wireless switch, router, access point (AP), bridge, or other network device which can flood a data packet, but the invention is not limited thereto. The network device 200 comprises a loopback detection module 210 and a plurality of ports P0, P1, P2, and P3. The loopback detection module 210 further comprises a loopback detection unit 220, a frame analysis unit 230, a processing unit 240, and a test packet generation unit 250. The ports P0, P1, P2, and P3 all comprise a frame receiving unit Rx and a frame transmitting unit Tx. The ports P0, P1, P2, and P3 are coupled to the loopback detection unit 220 and the processing unit 240, and a frame analysis unit 230 is coupled to the loopback detection unit 220, the processing unit 240 and the test packet generation unit 250. It should be noted that the number of ports in the invention is not limited. A single port can also be applied to the network device 200, and the loopback would occur not only between several network devices but also between the ports of a single network device.

When the loopback detection module 210 in the embodiment is implemented with hardware on a medium access control (MAC) layer, the loopback detection module 210 can be a central processing unit (CPU) with computation ability, such as a microprocessor, a microcontroller or a field programmable gate array (FPGA). The loopback detection unit 220, the frame analysis unit 230, the processing unit 240 and the test packet generation unit 250 can be implemented by software or firmware executed by the CPU. In other words, the units can be implemented by each functional unit of the CPU, or the loopback detection module 210 in the embodiment can be a special application circuit without computation abilities, and which merely provides basic network functions related to receiving, transmitting, processing, determining and controlling the packets, but it is not limited thereto.

In the embodiment, the network device 200 generates and transmits a loopback detection frame to detect whether a loopback has occurred. Table 1 is a specification of the loopback detection frame according to an embodiment of the invention. Each loopback detection frame contains the following fields and the length in data byte corresponding to each field: Destination Address (DA), Source Address (SA), Virtual Local Area Network Tag (VLAN TAG), Length, Logical Link Control (LLC), Organizationally Unique Identifier (OUI), Type, Logic Port Number, VLAN identifier (VLAND ID), Padding, Frame Check Sequence (FCS) and other fields, but the invention should not be limited to this order and length of fields.

The destination address field records the destination address of the loopback detection frame. In an embodiment of the invention, the destination address is an unknown unicast address, or a specific MAC address that is different from the MAC address of any network device or any port. The source address field records the source address of the network device transmitting the loopback detection frame, wherein the content of the source address field is the Media Access Control (MAC) address of the network device. The VLAN TAG field records whether the frame packet is assigned to be transmitted in specific VLAN(s). The length field records the overall length of the LLC, OUI, Type, logic port number, VLAN ID in bytes. The LLC field records the corresponding code of the transmission control signal transmitted in the network transport layers, for switching the control signals, controlling data flow, translating and responding to the commands transmitted from the upper layer protocol, and overcoming any problems that occurred during data transmission, such as data error, duplicate data, mismatch in transmitted data order and received data order, etc. The OUI field records the code of network device vendor, which is assigned by IEEE. The type field records the service type of the frame packet. The logic port number field records the port number of the port transmitting the loopback detection frame. The VLAN ID field records the frame packet is assigned to be transmitted in which specific VLAN (if it is), or the frame packet is not assigned to be transmitted in any VLAN. The content of the padding field and FCS field are set by the vendor of the network device 200.

TABLE 1

| DA | SA | VLAN TAG | Length | LLC | OUI | Type | Logic port number | VLAN ID | Padding | FCS |
|---|---|---|---|---|---|---|---|---|---|---|
| 6 | 6 | 4 | 2 | 3 | 3 | 2 | 4 | 4 | 34 | 4 |

Figure 3:
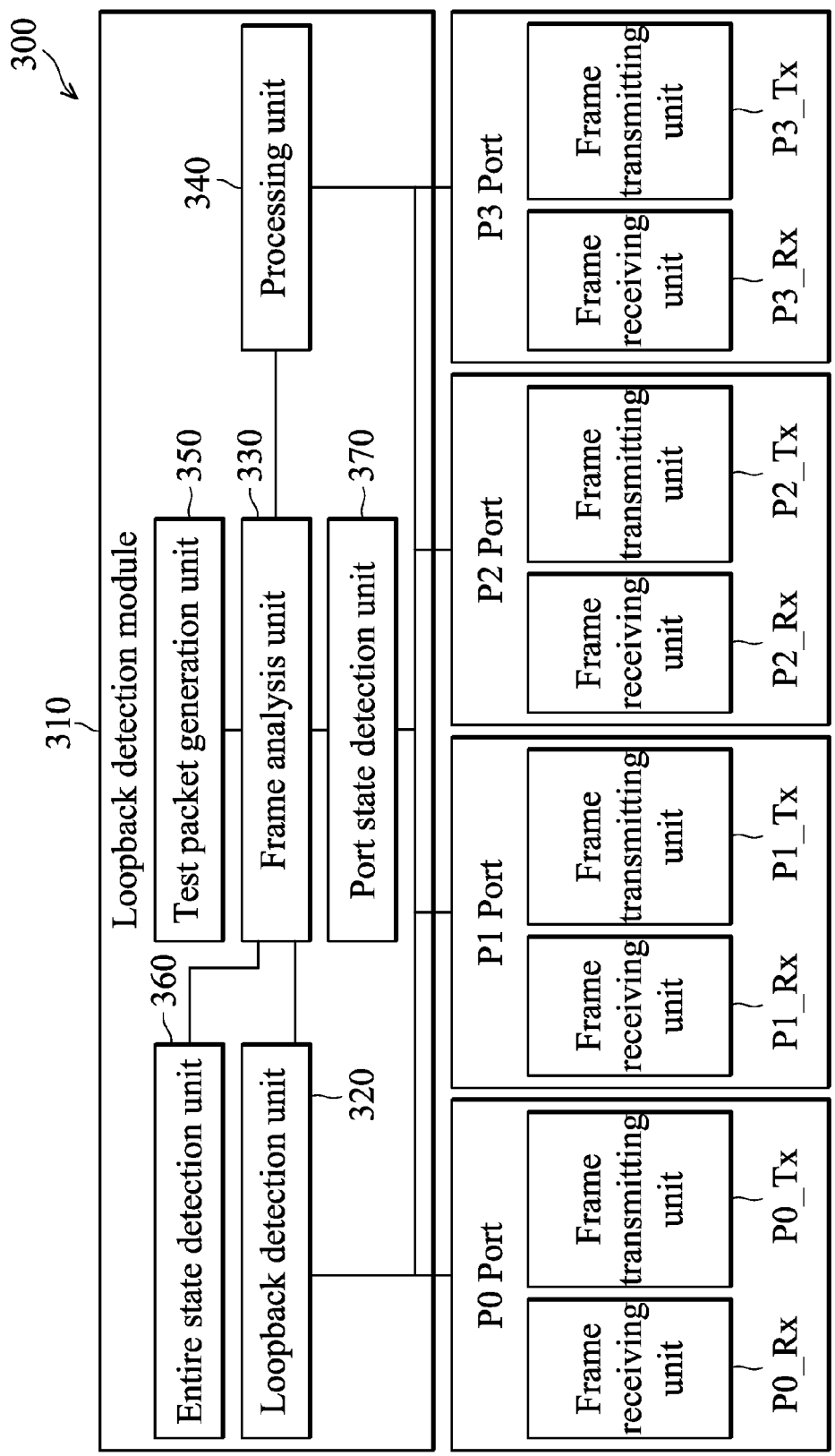
FIG. 3 is a block diagram of a network device according to another embodiment of the present invention.

As shown in FIG. 3, in another embodiment, the loopback detection module 310 of the network device 300 also comprises an entire state detection unit 360 and a port state detection unit 370. The entire state detection unit 360 detects whether the network device 300 enables a loopback detection function, and the port state detection unit 370 detects whether each port of the network device 300 supports and enables the function of transmitting the loopback detection frame. In other words, after the loopback detection function of the network device 300 is enabled, the function of transmitting the loopback detection frame still has to be enabled by each port so that the test packet generation unit 350 may generate the loopback detection frame for each port and the loopback detection frame can be transmitted via the frame transmitting unit Tx of each port to execute the loopback detection function and determine whether loopback has occurred. It is worth noting that it is presupposed that the network device 200 mentioned in the aforementioned embodiment supports the loopback detection function, and the function of transmitting the loopback detection frame of each port is enabled. The technical contents of other functional units in FIG. 2 are similar to the units in FIG. 3.

Table 2 illustrates a relationship between the entire state and the port state according to an embodiment of the invention. When the network device 300 enables the loopback detection function and at least one port enables the function of transmitting the loopback detection frame, the network device 300 may execute the loopback detection function. If the network device 300 does not enable the loopback detection function, or the port does not support or enable the loopback detection function, the network device 300 fails to execute the loopback detection function. It should be noted that the technical content of the entire state detection unit 360 and the port state detection unit 370 are similar to the functional units described above, so details related to the functions of the units will be omitted.

However, even though the network device 300 in the embodiment does not execute the loopback detection function because the function of transmitting the loopback detection frame is not enabled, the network device 300 may still receive and recognize the loopback detection frame but not determine whether the loopback has occurred. Therefore, when receiving the loopback detection frame, the network device 300 still determines the source where the loopback detection frame comes from. If the loopback detection frame comes from the network device 300, namely, the SA field of the loopback detection frame is consistent with the MAC address of the network device 300, the network device 300 may consider the loopback detection frame an error and drop the loopback detection frame because the network device 300 is not currently executing the loopback detection function. Or when the loopback detection frame comes from other networks devices, namely, the SA field of the loopback detection frame is different from the MAC address of the network device 300, the network device 300 floods the loopback detection frame to other network devices. In another embodiment, the network device 300 which enables the loopback detection function and has a port with the function of transmitting the loopback detection frame enabled may further preset a predetermined time period, and therefore the test packet generation unit 350 may generate and transmit the loopback detection frame periodically to detect whether loopback has occurred.

network device does not support the loopback detection function of the invention (namely, the network device may not recognize the received loopback detection frame and may merely consider the received loopback detection frame as a data signal), the network device does not detect the content of the received loopback detection frame and floods the loopback detection frame directly.

TABLE 2

|  |  | Port State: function of transmitting the loopback detection frame by the port | |
| --- | --- | --- | --- |
|  |  | Enable | Disable |
| Entire State | Enable the loopback detection function | 1. The port can transmit and receive the loopback detection frame. 2. The network device can execute the loopback detection function. | 1. The port cannot transmit but can receive the loopback detection frame. 2. The network device cannot execute the loopback detection function. 3. If the loopback detection frame received by the network device comes from the network device itself, the network device drops the loopback detection frame. If the loopback detection frame received by the network device comes from other network devices, the network device floods the loopback detection frame. |
|  | Disable the loopback detection function | 1. The port cannot transmit but can receive the loopback detection frame. 2. The network device cannot execute the loopback detection function. 3. If the loopback detection frame received by the network device comes from the network device itself, the network device drops the loopback detection frame. If the loopback detection frame received by the network device comes from other network devices, the network device floods the loopback detection frame. | 1. The port cannot transmit but can receive the loopback detection frame. 2. The network device cannot execute the loopback detection function. 3. If the loopback detection frame received by the network device comes from the network device ifself, the network device drops the loopback detection frame. If the loopback detection frame received by the network device comes from other network devices, the network device floods the loopback detection frame. |

Table 3 illustrates an entire state according to an embodiment of the invention, and includes the relationships regarding whether the loopback detection function is enabled, the source of the loopback detection frame and how to handle the loopback detection frame. When the network device 300 receives the loopback detection frame from another network device, the network device 300 floods the loopback detection frame according to a Virtual Local Area Network (VLAN) rule no matter what VLAN tag the loopback detection frame is tagged with. For example, the loopback detection frame may be flooded to another port in the same VLAN. When the network device 300 receives the loopback detection frame from itself and does not execute the loopback detection function, the network device 300 drops the loopback detection frame. When executing the loopback detection function, the network device 300 further checks the loopback detection frame to determine whether the loopback has occurred. If a

TABLE 3

|  |  |  | Loopback detection function of the network device | | |
| --- | --- | --- | --- | --- | --- |
|  |  |  | Not Support | Disable | Enable |
| The source of the loopback detection frame and the handling of the tag | Network Device Itself | Untagged | Flood | Drop | Check |
|  |  | Tagged | Flood | Drop | Check |
|  | Other Network Device | Untagged | Flood | Flood | Flood |
|  |  | Tagged | Flood | Flood | Flood |

According to an embodiment of the invention, when the loopback detection unit 220/320 performs loopback detection on a port by transmitting the loopback detection frame, the loopback detection unit 220/320 transmits a corresponding loopback detection frame to each tagged VLAN that the port joins in, and transmits a corresponding loopback detection frame to all the untagged VLAN(s) that the port joins in. In this manner, the loopback detection frame packet can be flooded in the VLAN topology. When the network device receives the loopback detection frame packet transmitted by itself (comprising the cases transmitted by the same port or different ports of the same network device, and also applied hereinafter), the network device identifies in which tagged VLAN the loopback has occurred via the VLAN ID field. Note that when the network device receives the loopback detection frame packet transmitted in the untagged VLAN, the network device may regard it as the loopback having occurred in all the untagged VLAN(s).

According to an embodiment of the invention, when the loopback detection frame is received via a frame receiving unit Rx of one of the ports P0, P1, P2 and P3, the loopback detection unit 220/320 analyzes whether the SA field of the loopback detection frame is consistent with the MAC address of the network device 200/300, determines whether the received loopback detection frame is transmitted from the network device 200/300, and determines whether the received loopback detection frame is transmitted from one of the ports P0, P1, P2 and P3 of the network device 200/300 according to the logical port number field.

When the loopback detection frame is transmitted from one of the ports P0, P1, P2 and P3 of the network device 300, the frame analysis unit 330 further analyzes the loopback detection frame. In another embodiment, the frame analysis unit 330 further analyzes whether the content of the loopback detection frame is correct, so as to determine whether the loopback has occurred in the network device 200/300. In addition, the loopback detection unit 220/320 analyzes the VLAN ID field of the loopback detection frame to identify which VLAN the loopback detection frame is transmitted from back to the network device 200/300. Suppose that the VLAN ID field of the loopback detection frame is set to a tagged VLAN 1, which means that the loopback has occurred in the VLAN 1. Note that as described above, when the network device 200/300 receives the loopback detection frame packet transmitted in the untagged VLAN, the network device 200/300 may regard it as loopback having occurred in all the untagged VLAN(s).

When the frame analysis unit 230/330 determines that the loopback has occurred in the network device 200/300, the processing unit 240/340 executes one of two types of actions which are preset in advance by the user. One is to shut down the port which transmits the loopback detection frame, wherein the port comprises the frame transmitting unit Tx and the frame receiving unit Rx, thereby shutting down the transmission and reception of the port. The other one is to only block the VLAN(s) that the port transmitting the loopback detection frame joins in and in which the loopback occurred. Note that in some embodiments of the invention, the processing unit 240/340 may also execute both of the two actions discussed above once the loopback has occurred in the network device 200/300.

In the embodiments of the invention, blocking the VLAN means that the port does not transmit any packet in the blocked VLAN for a predetermined time. Therefore, the port does not transmit any packet in the VLAN in which the loopback has occurred. Note that shutting down the port not only blocks the transmission and reception of the looped traffic of the port, but also blocks the transmission and reception of the normal traffic of the port. However, blocking the VLAN in which the loopback has occurred only blocks the transmission and reception of the looped traffic of the port. Therefore, the transmission and reception of the normal traffic of the port are not affected. In the embodiments of the invention, in order to avoid degrading the transmission and reception performance of the network device, once loopback has occurred, it is more preferable to block the VLAN in which the loopback has occurred.

In an embodiment of the invention, once the loopback has occurred in the network device 200/300, the test packet generation unit 250/350 further transmits a test packet to notify the user that the loopback has occurred. In another embodiment, the user may preset the loopback detection module 210, 310 to check the destination address (DA) field and the source address (SA) field in advance to reduce the burden on the subsequent computation and processing when detecting the loopback.

In one embodiment, each frame receiving unit Rx and frame transmitting unit Tx of the port P0, P1, P2 and P3 are implemented in the physical layer of the network device 200/300. The loopback detection frame transmitted from the network device 200/300 is further transmitted to other network devices through the frame transmitting unit Tx. The frame from the physical layer is received by the frame receiving unit Rx and is transmitted to the loopback detection unit 220/320. A bus between the frame receiving unit Rx, the frame transmitting unit Tx and the loopback detection unit 220/320 may be a high speed bus, but the present invention is not limited thereto.

Figure 4A:
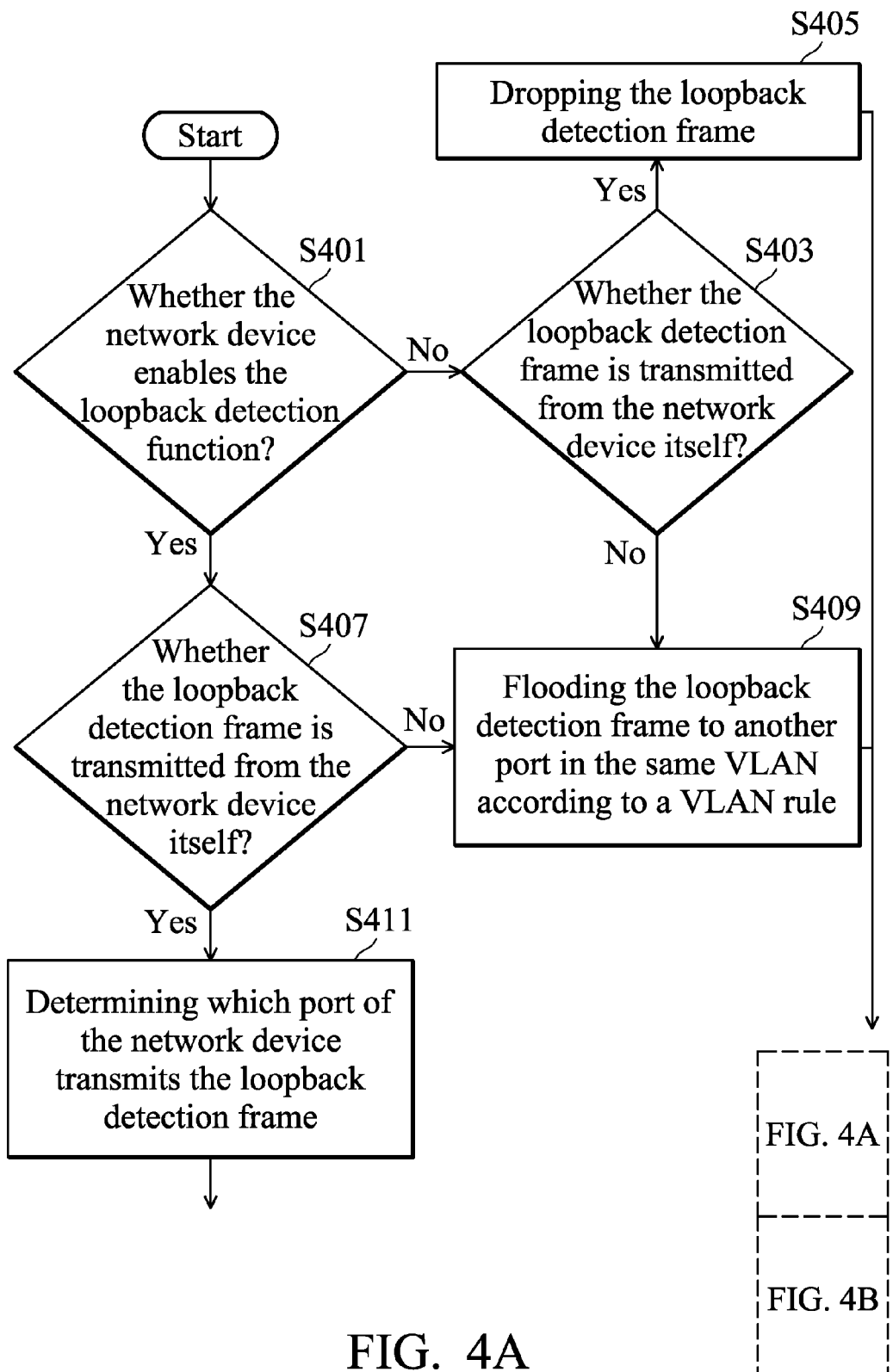
FIGS. 4A~4B are flow charts illustrating the method for loopback detection according to an embodiment of the invention.
Figure 4B:
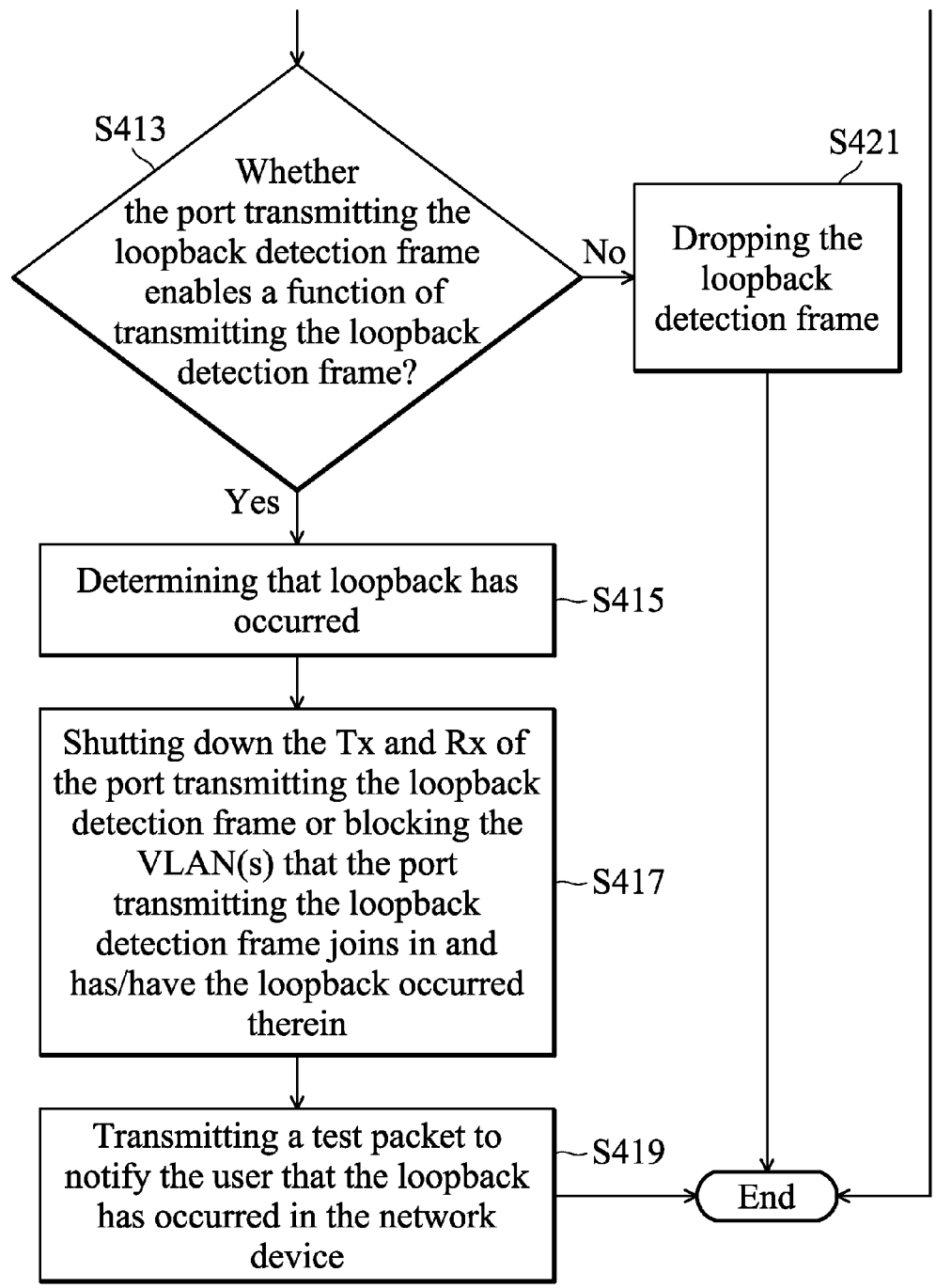

FIGS. 4A~4B are flow charts illustrating the method for loopback detection according to an embodiment of the invention. When the network device (e.g. the network device 200/300) receives a loopback detection frame by a port, in step S401, the entire state detection unit (e.g. the entire state detection unit 360) detects whether the network device enables the loopback detection function. If the network device does not enable the loopback detection function ("No" in step S401), in step S403, the loopback detection unit (e.g. the loopback detection unit 220/320) of the network device further determines whether the loopback detection frame is transmitted from the network device itself. When the loopback detection frame is transmitted from the network device itself ("Yes" in step S403), in step S405, the loopback detection unit drops the loopback detection frame. When the loopback detection frame is transmitted from other network devices, ("No" in step S403), in step S409, the loopback detection unit floods the loopback detection frame to another port in the same VLAN according to a VLAN rule. If the network device enables the loopback detection function ("Yes" in step S401), in step S407, the loopback detection unit of the network device further determines whether the loopback detection frame is transmitted from the network device itself. If the loopback detection frame is transmitted from another network device ("No" in step S407), in step S409, the loopback detection unit floods the loopback detection frame to another port in the same VLAN according to the VLAN rule. If the loopback detection frame is transmitted from the network device itself ("Yes" in step S407), in step S411, the loopback detection unit further determines which port of the network device transmits the loopback detection frame. In step S413, the port state detection unit (e.g. the port state detection unit 370) detects whether the port transmitting the loopback detection frame enables the function of transmitting the loopback detection frame. When the port transmitting the loopback detection frame does not enable the function of transmitting the loopback detection frame ("No" in step S413), in step S421, the port state detection unit drops the loopback detection frame.

When the port transmitting the loopback detection frame enables the function of transmitting the loopback detection frame ("Yes" in step S413), in step S415, the frame analysis unit (e.g. the frame analysis unit 230/330) determines whether loopback has occurred by analyzing the SA field and the logic port number field of the loopback detection frame. Note that in the embodiments of the invention, the steps S401 and S413 can be skipped for the network device 200 since the corresponding functions are activated by default.

When the frame analysis unit determines that the loopback has occurred, in step S417, the processing unit (e.g. the processing unit 240/340) may execute one of two actions according to the setting of the user: shut down the frame transmitting unit Tx and the frame receiving unit Rx of the port transmitting the loopback detection frame, so as to shut down the transmission and reception of the port, or block the VLAN(s) that the port transmitting the loopback detection frame joins in and in which the loopback occurred, such that the port does not transmit any packet in the VLAN(s) that has/have the loopback occurred therein. As discussed above, the frame analysis unit identifies in which tagged VLAN the loopback has occurred via the VLAN ID field, or identities the loopback has occurred in all the untagged VLAN(s). Note that in some embodiments of the invention, one or more than one action may be executed in step S417.

In step S419, the test packet generation unit (e.g. the test packet generation unit 250/350) further transmits a test packet to notify the user that the loopback has occurred in the network device, wherein the content of the test packet may be information about the loopback that has occurred, such as the port causing the loopback, and whether to shut down the port process, whether to block the VLAN, or others, so that the user may decide on the subsequent processing according to the test packet.

Note that step S419 is an optional step. That is, in other embodiments of the invention, after shutting down the port or blocking the VLAN(s) by the processing unit, the process shown in FIG. 4A and FIG. 4B can be ended. In the preferred embodiments of the invention, shutting down the port or blocking the VLAN(s) may be performed via setting the corresponding software.

In addition, in another preferred embodiment of the invention, the processing unit may further wait for a preset time after shutting down the port or blocking the VLAN(s). After the preset time expires, the processing unit may recover the transmission and reception of the port, or unblock the blocked VLAN. The purpose of recovering the transmission and reception of the port or unblock the blocked VLAN after the preset time has expired is that for the loopback detection module to be able to detect the loopback again, and to make sure that when the loopback condition is released, the shutdown port or blocked VLAN(s) may be recovered and function normally.

Due to the requirement that the hardware not be extensive, the method and the network device for loopback detection in this invention merely needs the basic functioning of the network devices, such as the processing, determination and control of the packet. Therefore, the method and the network device for loopback detection in this invention may be adaptable to all network devices and may achieve the effect of detecting the loop effectively no matter whether the network device has a central processing unit or computation ability.

In addition, in the proposed method for loopback detection, when the loopback analysis unit determines that loopback has occurred, the processing unit may selectively shut down the transmission and reception of the port or blocking the VLAN(s) that has/have the loopback occurred therein according to the user's settings, making the port to be unable to transmit any packet in the VLAN(s) in which the loopback occurred. In this manner, the transmission and reception of the looped traffic of the port are blocked while the transmission and reception of normal traffic are not affected, which can greatly reduce the transmission and reception performance degradation of the network devices.

In addition, since the recovery mechanism is also applied in the loopback detection method, when the port is shut down or when the looped VLAN(s) is/are blocked, the transmission and reception of the port can be recovered or the blocked VLAN(s) can be unblocked after the preset time expires. In this manner, the loopback detection module may perform loopback detection again. Thus, when the loopback condition is released, the shutdown port or blocked VLAN(s) may be recovered and function normally.

The above-described embodiments of the present invention can be implemented in any of numerous ways. For example, the embodiments may be implemented using hardware, software or a combination thereof. It should be appreciated that any component or collection of components that perform the functions described above can be generically considered as one or more processors that control the above discussed function. The one or more processors can be implemented in numerous ways, such as with dedicated hardware, or with general purpose hardware that is programmed using microcode or software to perform the functions recited above.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for loopback detection which applied in a network device, comprising:
    receiving a loopback detection frame from a port;
    detecting and determining whether the loopback detection frame is transmitted via the port by a loopback detection module;
    analyzing the loopback detection frame and determining whether a loopback has occurred in the network device by the loopback detection module when the loopback detection frame is transmitted via the port;
    once the loopback has occurred, determining by the loopback detection module in which of one or more virtual local area networks (VLANs) that the port joins in the loopback has occurred;
    blocking the VLAN(s) that the port transmitting the loopback detection frame joins in and in which the loopback occurred by the loopback detection module, for the port being unable to transmit any packet in the blocked VLAN(s); and
    once the loopback has not occurred, dropping the loopback detection frame by the loopback detection module.

2. The loopback detection method as claimed in claim 1, wherein once the loopback has occurred, the method further comprises:
    shutting down transmission and reception of the port transmitting the loopback detection frame by the loopback detection module.

3. The loopback detection method as claimed in claim 1, further comprising:
    generating the loopback detection frame in a predetermined time period by the loopback detection module; and transmitting the loopback detection frame by the port, wherein the loopback detection frame at least comprises:
  a source address (SA) field;
  a VLAN identifier field; and
  a logical port number field,
  wherein the SA field and the logical port number field of the loopback detection frame are analyzed by the loopback detection module to determine whether the loopback has occurred in the network device.

4. The loopback detection method as claimed in claim 3, wherein the VLAN identifier field of the loopback detection frame is analyzed by the loopback detection module to identify which of the one or more VLANs that the port joins in and has the loopback occurred in.

5. The loopback detection method as claimed in claim 1, further comprising:
  waiting for a preset time and unblocking the blocked VLAN(s) after the preset time expires.

6. The loopback detection method as claimed in claim 2, further comprising:
  waiting for a preset time and recovering transmission and reception of the port after the preset time expires.

7. A network device, comprising:
  a port, configured to receive a loopback detection frame; and
  a loopback detection module, comprising a loopback detection unit, a frame analysis unit and a processing unit,
  wherein the loopback detection unit is coupled to the port and detects whether the loopback detection frame is transmitted from the port;
  the frame analysis unit is coupled to the loopback detection unit, and when the loopback detection frame is transmitted from the port, the frame analysis unit analyzes the loopback detection frame and determines whether a loopback has occurred in the network device, and wherein once the loopback has occurred in the network device, determines the loopback has occurred in which of one or more virtual local area networks (VLANs) that the port joins in, and once the loopback has not occurred, drops the loopback detection frame; and
  the processing unit is coupled to the port and the frame analysis unit, once the loopback has occurred in the network device, the processing unit blocks the VLAN(s) that the port transmitting the loopback detection frame joins in and in which the loopback occurred, for the port being unable to transmit any packet in the blocked VLAN(s).

8. The network device as claimed in claim 7, wherein when the loopback has occurred, the processing unit further shuts down transmission and reception of the port transmitting the loopback detection frame.

9. The network device as claimed in claim 7, further comprising:
  a test packet generation unit, configured to generate the loopback detection frame in a predetermined time period and the loopback detection frame is transmitted by the port for continuing to detect whether the loopback has occurred in the network device, wherein the loopback detection frame at least comprises:
    a source address (SA) field;
    a logical port number field; and
    a VLAN identifier field,
  wherein the frame analysis unit analyzes the SA field and the logical port number field of the loopback detection frame to determine whether the loopback has occurred in the network device.

10. The network device as claimed in claim 9, wherein the frame analysis unit analyzes the VLAN identifier field of the loopback detection frame to identify the loopback has occurred in which of the one or more VLANs that the port joins in.

11. The network device as claimed in claim 7, wherein the processing unit further waits for a preset time and unblocks the blocked VLAN(s) after the preset time expires.

12. The network device as claimed in claim 8, wherein the processing unit further waits for a preset time and recovers transmission and reception of the port after the preset time expires.

* * * * *